United States Patent [19]

Graves

[11] Patent Number: 4,480,857
[45] Date of Patent: Nov. 6, 1984

[54] GIMBAL CONDUIT JOINT

[75] Inventor: Robert W. Graves, Canoga Park, Calif.

[73] Assignee: Aeroquip Corporation, Jackson, Mich.

[21] Appl. No.: 380,225

[22] Filed: May 20, 1982

[51] Int. Cl.³ .......................................... F16L 27/00
[52] U.S. Cl. .................................... 285/45; 285/226; 285/265
[58] Field of Search ...................... 285/265, 45, 226; 403/57, 74

[56] References Cited

U.S. PATENT DOCUMENTS

| | | | |
|---|---|---|---|
| 2,904,365 | 9/1959 | Love | 285/265 X |
| 2,936,185 | 5/1960 | Olsen et al. | 285/265 X |
| 3,112,129 | 11/1963 | Willis et al. | 285/226 |
| 3,770,303 | 11/1973 | Hallett | 285/45 |
| 3,915,482 | 10/1975 | Fletcher et al. | 285/265 X |

Primary Examiner—Thomas F. Callaghan
Attorney, Agent, or Firm—Beaman & Beaman

[57] ABSTRACT

The invention pertains to a double gimbal joint construction for rigid conduit or duct systems. The joint includes a gimbal assembly consisting of a pair of sheet metal concentrically related rings maintained in radial spaced relationship by annular spacers located at 90° circumferential intervals about the rings wherein pivot pins extend through the spacers. Annular conduit receiving collars are pivotally attached to the gimbal ring assembly by fork lugs pivotally connected to the spacer and pivot pin assemblies intermediate the inner and outer rings. The construction permits a "double" shear relationship to be established at the fork lugs and pivot pins improving anti-shear characteristics, and the sheet metal construction reduces costs.

10 Claims, 7 Drawing Figures

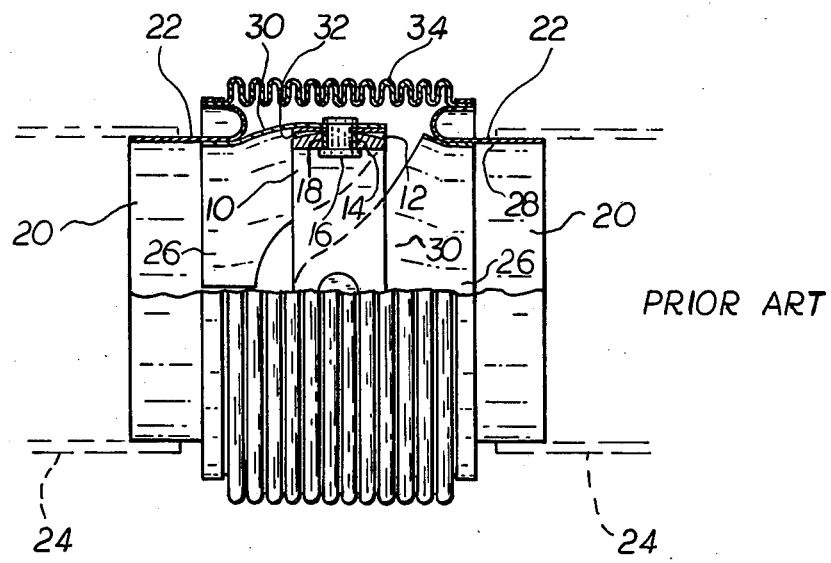
Fig_1_ PRIOR ART
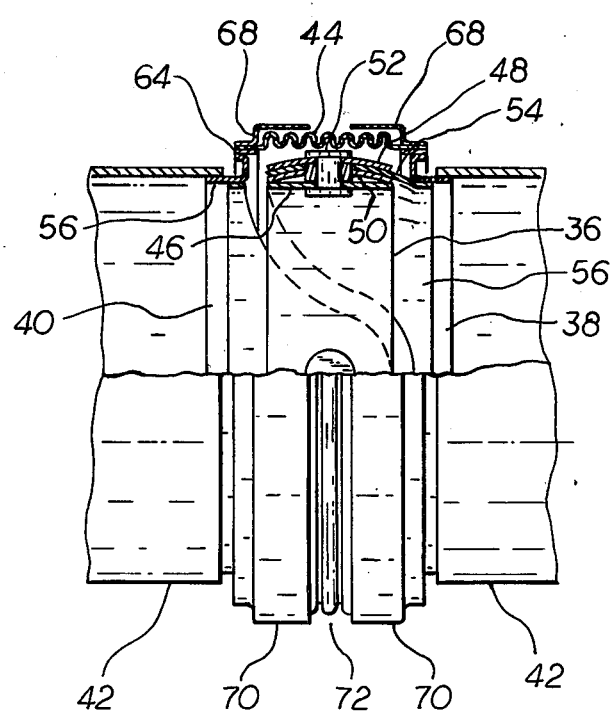
Fig_2_

U.S. Patent  Nov. 6, 1984  Sheet 2 of 2  4,480,857
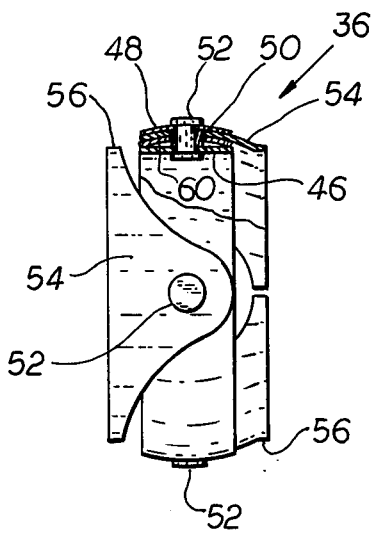
Fig_3.
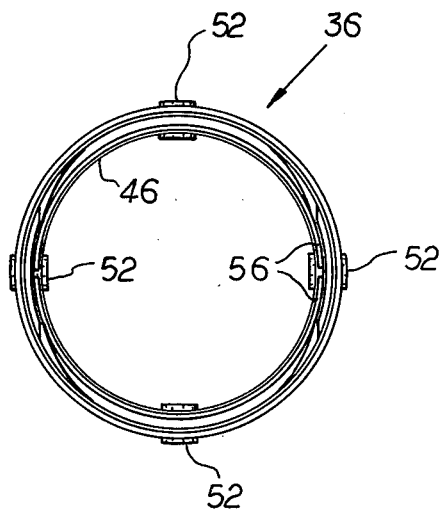
Fig_4.
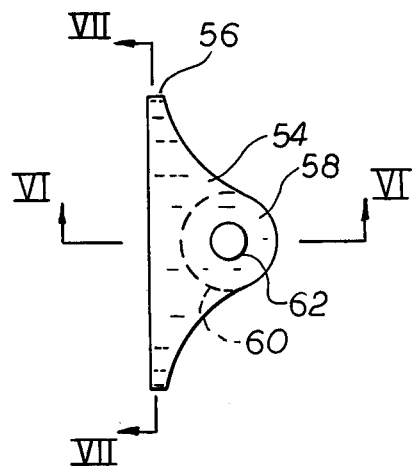
Fig_5.
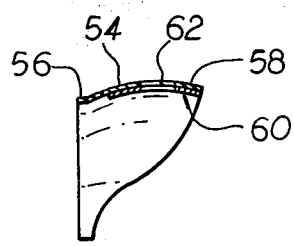
Fig_6.
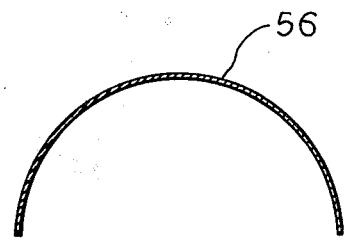
Fig_7.

GIMBAL CONDUIT JOINT

BACKGROUND OF THE INVENTION

Rigid conduit systems include a plurality of joints to which the ends of the rigid conduits are attached. The joints, in themselves, may be rigid, but in many applications it is desired that the system have a degree of flexibility, and in those cases the joint includes flexing structure capable of accommodating angular adjustment between adjacent conduits of a limited degree without leakage or loss of integrity of the conduit system. Flexible joints for a rigid conduit system must be capable of withstanding tension and compression axial forces imposed upon the conduits, i.e. "end loads" as well as restrain torsional loads, and must also remain leak prook even though misalignment between adjacent conduits has occurred.

One type of joint that has been used by the assignee to interconnect the ends of adjacent rigid conduits is a joint utilizing a double gimbal mechanical interconnection. In this type of double gimbal joint a gimbal ring includes four pivot pin members mounted upon the ring at 90° intervals about the circumference thereof. An annular collar is connected to the end of the conduits, such as by solder or welding, and extensions of the collar pivotally cooperate with two pivot pins on the ring which are in diametrically opposed relation. In this matter the adjacent ends of the conduits attached to a common joint are capable of pivoting about axes related 90° to each other, and in a common plane, wherein a universal angular displacement between the conduits in all directions is possible, and the joint effectively prevents relative axial displacement between the adjacent conduits under end loads.

The collars affixed to a common joint are sealed with respect to each other by a short flexible conduit, such as a metal bellows, which will permit limited angular displacement between adjacent conduits while maintaining the fluid tight integrity of the system. As the gimbal joint absorbs all of the axial forces imposed upon the conduits the flexible conduit need not have a high strength resistance to axial forces, and need only be capable of withstanding the internal fluid pressures.

In the double gimbal joint constructions previously available, including those produced by the assignee, the gimbal ring assembly consists of a circular ring of a substantially solid machined construction having four pivot pins in the form of rivets circumferentially radially extending through the ring at 90° intervals. The collars are pivotally attached to the rivets at the exterior of the ring, and accordingly, a bending or "single" shear stress is placed upon the pivot pin rivets by end loads imposed upon the conduits. Such forces imposed upon the pivot rivets may cause rivet failures which can result in excessive deformation and forces being applied to the flexible conduit interconnecting the joint collars, resulting in leakage and failure of the conduit system.

It is an object of the invention to provide a gimbal joint for rigid conduit or duct systems wherein a gimbal ring assembly is formed of sheet metal, and wherein an improved distribution of shear forces upon pivot structure is attained.

Another object of the invention is to provide a double gimbal joint for rigid conduit systems wherein all of the components, other than the pivot pin structure, may be formed of sheet metal without sacrifice of stress resistant characteristics.

An additional object of the invention is to provide a double gimbal joint for use with rigid conduit systems utilizing a gimbal ring formed of inner and outer sheet metal rings maintained in spaced relationship wherein pivotal connections upon the ring assembly occur intermediate the spaced rings.

Yet another object of the invention is to provide a double gimbal joint for rigid conduit systems wherein collars of the joint are interconnected by a flexible metallic conduit and the joint includes a protective shield extending over portions of the flexible conduit.

In the practice of the invention the joint consists of a pair of annular collars mounted upon opposite sides of a double gimbal ring assembly wherein the collars are pivotally connected to the ring assembly for pivotal movement about axes perpendicularly related to each other within a common plane. The double gimbal ring assembly is formed by a cylindrical inner sheet metal ring circumscribed by an outer sheet metal ring having a convex transverse cross section. The inner and outer rings are maintained in a radially spaced relationship by four pivot pin assemblies located at 90° intervals about the circumferences of the inner and outer rings.

The pivot pin assemblies each include an annular spacer having a circular periphery located between the inner and outer rings to maintain the radial spacing therebetween, and a pivot pin rivet extends through each spacer, and through aligned holes defined in the inner and outer rings to assemble the spacers to the rings and maintain the assembly of the gimbal ring.

The annular collars are located upon opposite axial sides of the gimbal ring assembly and each include a cylindrical surface to which the rigid conduits are sealingly affixed by welding, soldering, or other bonding techniques. Each collar is mounted to the gimbal ring by a pair of sheet metal fork lugs welded or soldered to the associated collar, and the fork lugs of a common collar extend intermediate the inner and outer gimbal assembly rings and are pivotally associated with spacers located at diametrically opposed locations on the ring assembly. The fork lugs engage the cylindrical surfaces of the spacer means, and in this manner the collars, and associated conduits, are capable of universal adjustment relative to each other due to the 90° orientation of the pivot axes of the collars.

The collars are sealed with respect to each other by a flexible metal conduit having a serpentine wall similar to a bellows. Each end of the flexible conduit is sealed to collar structure, and the flexible conduit encompasses the double gimbal ring assembly. Each collar includes a protective metal skirt which extends over a portion of the flexible conduit, less than half the axial dimension thereof, and these skirts aid in protecting the flexible conduit against external damage.

The portion of the fork lugs located intermediate the ring assembly inner and outer rings is of a convex configuration corresponding to the configuration of the outer ring, and preferably, a sheet metal reinforcing element is spot welded to the underside of the fork lugs at the location of engagement with the spacer to reinforce the fork lug at its pivot location. As the rivet extends through the inner and outer rings, and is thereby supported upon the rings upon opposite sides of the spacer, and as the fork lugs engage the spacer intermediate the inner and outer rings, a "double" shear relationship is established between the fork lugs and the rivets providing superior shear resistance as compared to prior art double gimbal joints using a solid ring assembly construction wherein a "single" shear relationship exists between the fork lugs and rivets.

The aforedescribed description of the double gimbal conduit joint results in an economically producible joint having excellent load resisting characteristics against end loads and torsion forces within the conduit system, yet the joint permits ready pivoting between adjacent conduits to accommodate adjustment, misalignment or assembly requirements. The separate fabrication of the fork lugs with respect to the collar simplifies manufacturing without sacrificing operating characteristics, and the protective skirts for the flexible conduit interconnecting the collars minimizes the likelihood of damage to the flexible conduit without adversely affecting the gimbal action of the joint.

BRIEF DESCRIPTION OF THE DRAWINGS

The aforementioned objects and advantages of the invention will be appreciated from the following description and accompanying drawings wherein:

FIG. 1 is an elevational view, partially in section, illustrating a double gimbal joint constructed in accord with prior art techniques, FIG. 2 is an elevational view, partially in section, of a double gimbal conduit joint in accord with the invention, FIG. 3 is an elevational view, partially in section, illustrating the gimbal ring assembly in accord with the invention, FIG. 4 is an elevational end view of the gimbal ring assembly of FIG. 3 as taken from the right thereof, FIG. 5 is a detailed elevational view of a fork lug in accord with the invention, FIG. 6 is a sectional elevational view of a fork lug in accord with the invention as taken along Section VI—VI of FIG. 5, and FIG. 7 is a sectional elevational view of a fork lug as taken along Section VII—VII of FIG. 5.

DESCRIPTION OF THE PREFERRED EMBODIMENT

FIG. 1 illustrates a double gimbal joint previously manufactured by the assignee over which the instant invention is an improvement. In the joint of FIG. 1 the gimbal ring 10 is formed of a solid machined ring having a cylindrical inner surface and a convex outer surface 12. The ring is provided with four radially extending holes 14 spaced at 90° intervals about the ring having coplanar axes, and a pivot pin rivet 16 is located within an annular bushing 18 located within each hole 14 to permit rotation of the rivet.

An annular rigid conduit receiving collar 20 is located upon each axial side of the ring 10, and includes a cylindrical surface 22 upon which the rigid conduit or duct, represented at 24 in dotted lines, can be welded, soldered, or otherwise affixed to the associated collar in a fluid tight relationship. Attached to each collar is an annular lug support 26 which is welded or soldered to the associated collar at its inner surface 28, and includes a pair of diametrically opposed axially extending extensions 30 which are each affixed to a diametrically opposed rivet 16 adjacent the ring outer surface 12. The rivets 16 are headed over to attach the extensions thereto, and a reinforcing element 32 is usually affixed to the underside of the lug extension surrounding the rivet. The lug extensions 30 are of an arcuate form to substantially correspond to the configuration of the ring outer surface.

The collars 20 are rolled at their inner ends to provide a cylindrical axially extending surface upon which the metal flexible conduit 34, in the form of a bellows, is attached, as by a welding, or a soldered joint. The flexible conduit 34 extends over the ring 10, and seals the collars with respect to each other, and yet permits relative pivoting of the collars 20 to accommodate annular adjustment of the conduits.

In the construction of FIG. 1 the conduit collars 20, through their associated lug extensions 30, are connected to the outer ends of the rivets 16. This relationship produces a "single" shear relationship between each rivet and its associated lug extension, the rivet, in effect, being supported by the ring in a cantilever manner, and end load forces existing within the conduit system tend to bend or shear the rivets 16 under adverse conditions causing complete failure of the joint, or under partial shear conditions, permitting such movement as to overstress the flexible conduit 34 and ultimately cause failure of the flexible conduit, and leakage.

Also, in the prior art construction of FIG. 1 the formation of the ring 10 as a machined solid component is expensive, and significantly adds to the manufacturing cost of the joint.

The construction of a double gimbal joint in accord with the invention will be appreciated from FIGS. 2-7. In the invention a gimbal ring assembly is generally indicated at 36, shown in its entirety in FIG. 3, and the gimbal ring assembly supoorts annular collars 38 and 40, FIG. 2, to which the rigid conduits 42 are mounted as by welding, soldering, or the like. The collars are sealed with respect to each other by a flexible sinuous walled conduit 44, and while the purpose and operation of the invention and the previously described prior art device are identical, the improvements of the invention will be readily apparent as described below.

The gimbal ring assembly 36 includes an inner sheet metal ring 46 of cylindrical configuration having inner and outer cylindrical surfaces. An outer sheet metal ring 48 circumscribes inner ring 46 in radially spaced concentric relationship thereto and the outer ring is of a transverse concaveconvex cross-sectional configuration as will be appreciated from the drawings.

Radial spacing between inner ring 46 and outer ring 48 is maintained by four annular spacer bushings 50 located intermediate the rings at 90° intervals about the circumferences of the rings. The inner and outer rings are drilled to form aligned radial holes at these locations, and a pivot pin rivet 52 extends through the ring holes, and through an aligned bushing, and is headed over to maintain the assembly of the rings. It will therefore be appreciated that each bushing 50 and pivot pin rivet 52 is in diametrically opposed relationship to an identical bushing and pivot pin rivet, such opposed rivets defining an aligned pivot axis for a collar, and the two pivot axes are disposed at 90° to each other and lie in a common plane.

A fork lug 54 is associated with each bushing and pivot pin rivet. The four fork lugs are identical, and their configuration is best appreciated from FIGS. 5-7. The fork lugs 54 are formed of sheet metal and include a semi-cylindrical segment 56 at their outer end which associates with the inner surface of a conduit collar 38 or 40, as later described. The portions 58 of the fork lugs are of an arcuate configuration to substantially correspond to the arcuate cross-sectional configuration of the outer gimbal assembly ring 48, and a sheet metal doubler element 60 is welded to the underside of the portion 58 wherein the fork lug hole 62 extends through both the doubler element and the portion 58 to form a double thickness at the location of connection with a bushing 50, as later described.

The diameter of the fork lug hole 62 substantially corresponds to the diameter of the outer cylindrical surface of the bushings 50, and the bushings are received within the fork lug holes prior to assembly of the gimbal ring being completed by the heading over of the rivets 52. Accordingly, the completed gimbal ring assembly 36 will appear as in FIGS. 3 and 4. The pivot pin rivets 52 are preferably headed over by a spinning operation to achieve a firm tight fit on the inner and outer rings and bushings, and yet a free pivoting of the fork lugs 54 relative to the rivets is maintained. The extent of the arc of the fork lug portions 56 is only a few degrees less than 180°, as will be appreciated from FIG. 4, and the collars may now be mounted upon the fork lug portions. As appreciated from FIG. 2, the collars 38 and 40 are each mounted upon the two fork lug cylindrical portions 56, by welding or soldering, which are located on a common side of the rings 46 and 48. As with the prior art embodiment, the collars 38 and 40 are rolled over at their inner end to define a cylindrical surface 64 radially located beyond the outer heads of rivets 52, and the flexible metal conduit 44 is affixed at its ends to the collar surfaces 64 by welding or soldering. The flexible conduit 44 has a sinuous wall which permits limited flexing, and yet the thickness of the conduit is such as to withstand the designed internal pressure existing within the joint during operation.

An annular sheet metal shroud 68 is also mounted upon each of the collars over the ends of the associated flexible conduit 44, and the shrouds each include a cylindrical skirt 70 which partially extends over the flexible conduit, but is of an axial length substantially less than one half of the axial length of the flexible conduit 44 wherein a clearance 72 exists between the opposed free edges of the skirts. The skirts 70 provide external protection for the flexible conduit, and the inner edges of the skirts, should they engage during extreme angular displacement of the rigid conduits associated with the joint, will help function as stops to resist further conduit displacement.

As the fork lugs 54 are associated with the spacer bushings 50 intermediate the inner ring 46 and outer ring 48 a more advantageous distribution of forces exists on the rivets 52 than in the case of the construction of the prior art joint shown in FIG. 1. As the rivets 52 are "supported" at each end by the inner and outer rings 46 and 48, respectively, and as the forces applied to the rivet are intermediate the locations of rivet support, a "double" shear support of the rivets is produced which reduces the likelihood of rivet failure as compared to the "single" shear relationship of the prior art embodiment of FIG. 1. The construction of the invention permits sheet metal components to be widely used throughout the entire joint, except for the spacer bushing and rivet, reducing the manufacturing costs without sacrifice to the performance characteristics. The end load forces imposed upon the gimbal ring assembly 36, whether either in compression or tension, will be effectively resisted by the joint and prevent overstressing of the flexible conduit 44. Free pivotal movement of each of the collars 38 and 40 about their respective pivot axes is maintained, and the double gimbal ring assembly is readily assembled without special apparatus.

It is appreciated that various modifications to the inventive concepts may be apparent to those skilled in the art without departing from the spirit and scope of the invention.

I claim:

1. In a double gimbal ring conduit joint including a circular gimbal ring wherein first and second conduit receiving collars are pivotally connected to the gimbal ring by pivot pins, the pivot axes of the collars being perpendicularly related to each other, and the collars being interconnected by a flexible conduit, the improvement comprising a gimbal ring assembly defined by inner and outer radially spaced sheet metal rings, spacer means located between said inner and outer rings maintaining said inner and outer rings in radially spaced relationship, first and second pairs of pivot pins mounted on said gimbal ring assembly, each pivot pin radially extending through said inner and outer rings and the pins of each pair being located upon diametrically opposite locations of said ring assembly and axially coincident to define a pivot axis, the pivot axes defined by each pivot pin pair being perpendicularly related, a conduit collar being pivotally connected to a pair of said pivot pins and connected to said pivot pins intermediate said inner and outer rings.

2. In a double gimbal conduit joint as in claim 1 wherein said spacer means are located adjacent said pivot pins and are coaxial therewith.

3. In a double gimbal conduit joint as in claim 2 wherein said spacer means each comprise an annular bushing, the adjacent pivot pin extending through the associated annular bushing and concentric therewith.

4. In a double gimbal joint as in claim 3, said bushings each having a cylindrical periphery and the conduit receiving collars being pivotally associated with said bushings.

5. In a double gimbal conduit joint as in claim 4, a sheet metal fork lug pivotally associated with each bushing, the pair of fork lugs associated with diametrically opposed bushings comprising a fork lug set, and a set of fork lugs being affixed to each conduit collar.

6. A double gimbal conduit joint comprising, in combination, a gimbal ring assembly constituting an inner circular sheet metal ring, an outer sheet metal ring circumscribing and concentric to said inner ring and radially spaced therefrom, four pivot pins radially extending through said rings spaced at 90° with respect to each other about the circumference of said rings, an annular bushing disposed about each pivot pin having a cylindrical periphery and located intermediate said inner and outer rings maintaining the radial spacing between said rings, an annular conduit receiving collar located at each axial side of said gimbal ring assembly having a pair of fork lugs defined thereon in diametrically opposed relation to each other, the fork lugs defined upon a common collar being pivotally associated with diametrically opposed pivot pins and bushings intermediate said inner and outer rings, and flexible conduit means encompassing said gimbal ring assembly and sealingly interconnecting said collars establishing a fluid tight connection between said collars.

7. In a double gimbal conduit joint as in claim 6, said fork lugs pivotally engaging the cylindrical periphery of said annular bushings.

8. In a double gimbal conduit joint as in claim 7, said pair of fork lugs being associated with each collar being formed of sheet metal and each being bonded to the associated collar, and a sheet metal reinforcing element welded to each fork lug at the point of connection of the fork lug to the associated bushing reinforcing the associated fork lug.

9. In a double gimbal conduit joint as in claim 6, an annular flexible conduit guard mounted upon each collar having a cylindrical skirt circumscribing and axially extending over less than one half the axial dimension of said flexible conduit externally protecting said flexible conduit and permitting relative angular displacement of said collars about their respective pivot pins.

10. In a double gimbal conduit joint as in claim 6, said outer gimbal ring assembly sheet metal ring being of an arcuate convex transverse cross section and said inner gimbal ring assembly sheet metal ring being of a cylindrical configuration.

* * * * *